US007377525B1

(12) United States Patent
Whitmore

(10) Patent No.: US 7,377,525 B1
(45) Date of Patent: May 27, 2008

(54) PORTABLE WORKTABLE

(76) Inventor: Andrew Whitmore, 14299 Bayview Avenue, Aurora, ON (CA) L4G 3G8

( * ) Notice: Subject to any disclaimer, the term of this patent is extended or adjusted under 35 U.S.C. 154(b) by 461 days.

(21) Appl. No.: 10/693,205

(22) Filed: Oct. 24, 2003

(51) Int. Cl.
*B62B 1/00* (2006.01)

(52) U.S. Cl. .................... 280/47.34; 280/47.41; 280/63; 280/65; 280/47.35; 280/79.11; 280/39; 280/640

(58) Field of Classification Search .............. 280/47.34, 280/47.41, 63, 65, 47.35, 79.11, 39, 639, 280/640; 108/11, 12, 119
See application file for complete search history.

(56) References Cited

U.S. PATENT DOCUMENTS 5,257,892 A * 11/1993 Branch ....................... 414/490
5,536,034 A * 7/1996 Miller ........................ 280/651
5,634,649 A * 6/1997 Breining et al. .......... 280/47.35
6,328,319 B1 * 12/2001 Stahler, Sr. .............. 280/47.18
6,578,856 B2 * 6/2003 Kahle .......................... 280/30
6,796,565 B2 * 9/2004 Choi et al. ............... 280/47.35

* cited by examiner

*Primary Examiner*—Christopher P. Ellis
*Assistant Examiner*—Cynthia F. Collado

(57) ABSTRACT

A portable worktable has a frame, top, legs, and latches. The frame has rails, a plate perpendicular to the rails, and supports beneath the rails for wheels. The top mounts upon runners hinged to the front and rear upper legs at the corners of the worktable. The worktable secures the top and the front upper legs perpendicular with a hinge assembly. The top holds cargo upon hooks. The front lower legs have casters while the rear lower legs end near the wheels. The hinge assemblies secure the upper and lower legs individually but have hinges for folding the legs towards the center of each rail.

15 Claims, 5 Drawing Sheets

PORTABLE WORKTABLE

BACKGROUND OF THE INVENTION

1. Field of the Invention

The present invention relates to a portable worktable for use in connection with supporting work pieces and tools at waist height. The portable worktable has particular utility for repairs inside finished building spaces and transport of cargo.

2. Description of the Prior Art

Portable worktables are desirable for workers using tools and materials at waist height. Collapsible, sturdy worktables have found wide use in building construction and maintenance. While the conventional worktable can be carried from place to place and stored in a collapsed form, transportation of the worktable for more than a short distance becomes burdensome and may damage building finishes and contents.

The uses of portable tables and hand trucks are known in the prior art. For example, U.S. Pat. No. 4,565,382 to Sherman discloses a light duty portable table and hand truck. However, the Sherman '382 patent does not have front casters, and has further drawbacks of not securing cargo behind the raised table and the wheels.

U.S. Pat. No. 5,536,034 to Miller discloses a convertible hand truck and dolly that accepts a table. However, the Miller '034 patent does not fix the sub-frame having casters, and additionally does not support the leg directly above the wheels.

Similarly, U.S. Pat. No. 234,486 to Leyburn discloses a hand truck that raises its bed with scissor action legs. However, the Leyburn '486 patent does not permit the hand truck to move with the bed in the raised position, and cannot carry cargo beneath the front end.

Similarly, U.S. Pat. No. 3,064,989 to Bellows discloses a collapsible dolly with a table supported on the dolly handle and by one pair of hinged legs. However, the Bellows '989 patent does not permit cargo on the hinged legs, and collapses by both folding the table and the legs into the frame between the bars.

Similarly, U.S. Pat. No. 4,611,823 to Haas discloses a two-wheeled stand for a machine with scissor action legs. However, the Haas '823 patent does not permit ready movement of the stand in a raised position, and cannot carry cargo on the legs.

Lastly, U.S. Pat. No. D384,467 to Stallbaumer discloses a side frame for a hand truck that has angle section members arranged in a generally triangular shape. However, the Stallbaumer '467 patent does not have tubular members, and has the additional deficiency of no top for use as a table.

While the above described devices fulfill their respective, particular objectives and requirements, the aforementioned patents do not describe a portable worktable that allows repairs inside finished building spaces and transport of cargo. The '382 patent makes no provision for casters and for carrying cargo. The '034 patent does not fix the sub-frame with casters. The '486 patent does not allow the truck to move in a raised position. The '989 patent does not carry cargo on the legs. The '823 patent does not have four wheels for ready movement. Then, the '467 patent lacks tubular members.

Therefore, a need exists for a new and improved portable worktable that can be used for repairs inside finished building spaces and transport of cargo. In this regard, the present invention substantially fulfills this need. The portable worktable according to the present invention substantially departs from the conventional concepts and designs of the prior art, and in doing so provides an apparatus primarily developed for the purpose of repairs inside finished building spaces and transport of cargo.

SUMMARY OF THE INVENTION

In view of the foregoing disadvantages inherent in the known types of tables and hand trucks now present in the prior art, the present invention provides an improved portable worktable, and overcomes the above-mentioned disadvantages and drawbacks of the prior art. As such, the general purpose of the present invention, which will be described subsequently in greater detail, is to provide a new and improved portable worktable and method which has all the advantages of the prior art mentioned heretofore and many novel features that result in a portable worktable which is not anticipated, rendered obvious, suggested, or even implied by the prior art, either alone or in any combination thereof.

To attain this, the present invention essentially comprises a portable worktable from a frame, top, upper legs, lower legs, wheels, casters, hinge assemblies, and hooks. The frame has a rectangular shape with two rails having a grip on a rounded end, denoting the front of the present invention. The rails are held parallel and apart by spacers. Each rail denotes a side of the portable worktable. A rectangular plate spans the rails at the rear of the frame, forming a generally L shape. Two supports hang beneath the plate on the inside of each rail. For movement, the portable worktable has a pair of wheels parallel to and outside of the rails with the wheels' axis near the bottom of the supports. The top has a rectangular plane shape that mounts upon two runners. The runners are parallel to each other and to the rails, and are located directly above the rails.

Under the top of the portable worktable, a pair of front upper legs is located at the front corners of the worktable. The front upper legs attach near the front end of the runners with a pivot joint. The portable worktable provides a means to secure the top and the front upper legs perpendicular to each other, placing the worktable at waist height. A pair of rear upper legs is positioned at the rear corners of the worktable. The rear upper legs attach near the rear end of the runners with a pivot joint. The top has a means to secure cargo proximate to the rear upper legs, facing out of the portable worktable.

Beneath the upper legs, a pair of front lower legs mates with the front upper legs individually. The struts extend below the rails ending in casters at the same plane as the bottom of the wheels. The front lower legs attach to the rails at a pivot joint and have a front fixed brace on a diagonal from the strut near the caster upwards and rearwards to the rail. A pair of rear lower legs mates with the rear upper legs individually. The rear lower legs extend alongside the rails, ending at the top of the wheels.

Each of the four legs has a hinge assembly between the upper and lower legs that connects each upper leg and lower leg individually at a hinge. The hinge assembly allows a worker to raise the portable worktable to waist height and to secure the legs. The hinge permits the legs to fold towards the center of the rails, raising and lowering the portable worktable.

There has thus been outlined, rather broadly, the more important features of the invention in order that the detailed description thereof that follows may be better understood and in order that the present contribution to the art may be better appreciated. The invention may also include inflatable tires and an air pump, lockable casters, and cargo hooks. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and the scope of the present invention.

It is therefore an object of the present invention to provide a new and improved portable worktable that has all of the advantages of the prior art tables and hand trucks and none of the disadvantages.

It is another object of the present invention to provide a new and improved portable worktable that may be easily and efficiently manufactured and marketed.

An even further object of the present invention is to provide a new and improved portable worktable that has a low cost of manufacture with regard to both materials and labor, and which accordingly is then susceptible of low prices of sale to the consuming public, thereby making such portable worktable economically available to the buying public.

Still another object of the present invention is to provide a new portable worktable that provides in the apparatuses and methods of the prior art some of the advantages thereof, while simultaneously overcoming some of the disadvantages normally associated therewith.

Even still another object of the present invention is to provide a portable worktable for repairs inside finished building spaces and transport of cargo. This allows moving the portable worktable in a raised position with minimal risk of damaging contents inside a building.

Still yet another object of the present invention is to provide a portable worktable for repairs inside finished building spaces and transport of cargo. This makes it possible to store the present invention compactly.

Still yet another object of the present invention is to provide a portable worktable for repairs inside finished building spaces and transport of cargo. This makes it possible to transport equipment such as a ladder upon the present invention.

Lastly, it is an object of the present invention to provide a new and improved method of assembling a portable worktable, capable of movement from a lowered position similar to a two wheeled hand truck to a raised position similar to a four wheeled platform cart by the steps of: 1) placing the wheels and casters on a surface, 2) lifting the top and the upper legs so that the upper legs align with the lower legs, 3) actuating the hinge assemblies to secure the upper legs and lower legs, and 4) the portable worktable is removed from a location by performing the previous steps in reverse order.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description males reference to the annexed drawings wherein.

The same reference numerals refer to the same parts throughout the various figures.

DESCRIPTION OF THE PREFERRED EMBODIMENT

Figure 1:
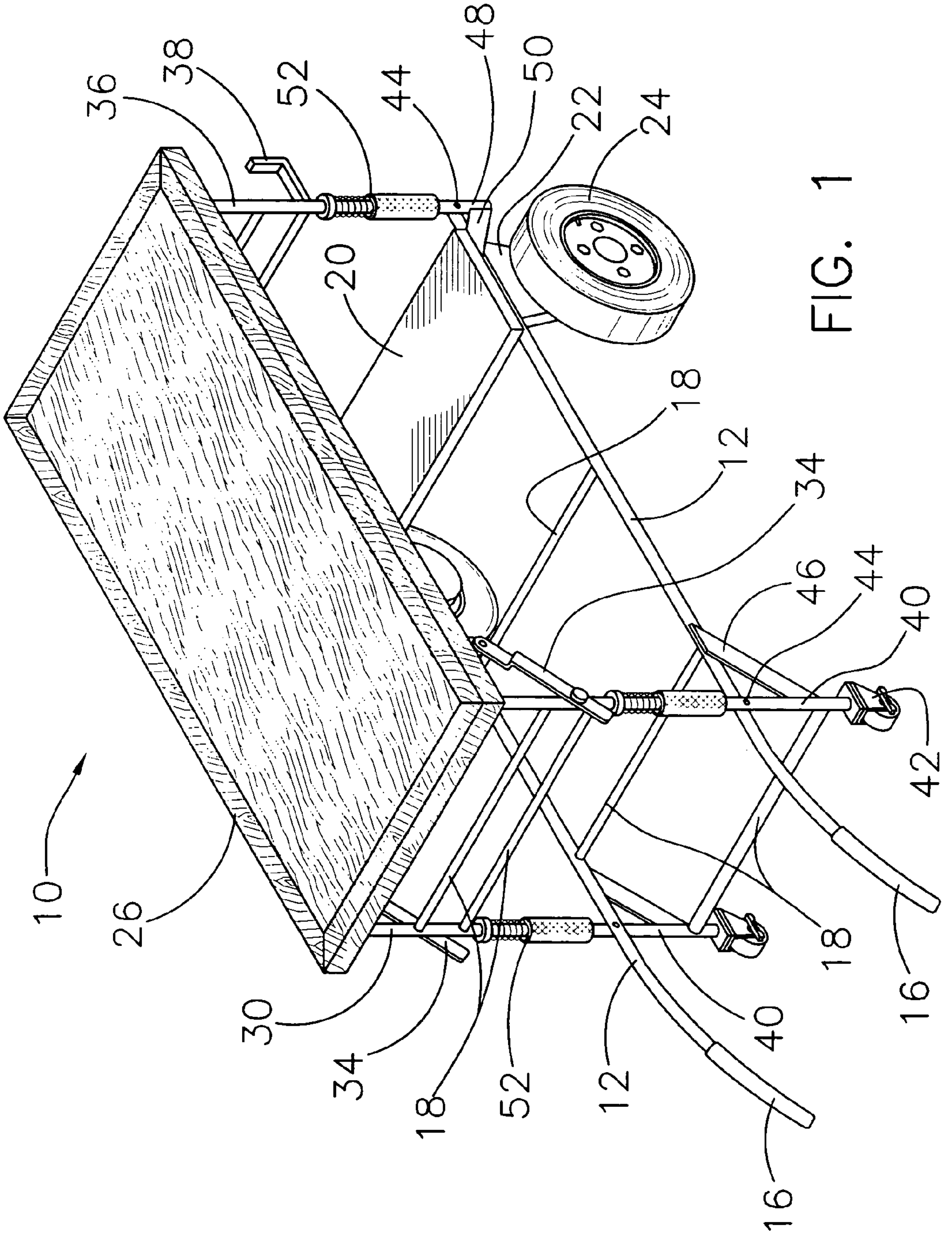
FIG. 1 is a perspective view of the preferred embodiment of the portable worktable constructed in accordance with the principles of the present invention.
Figure 2:
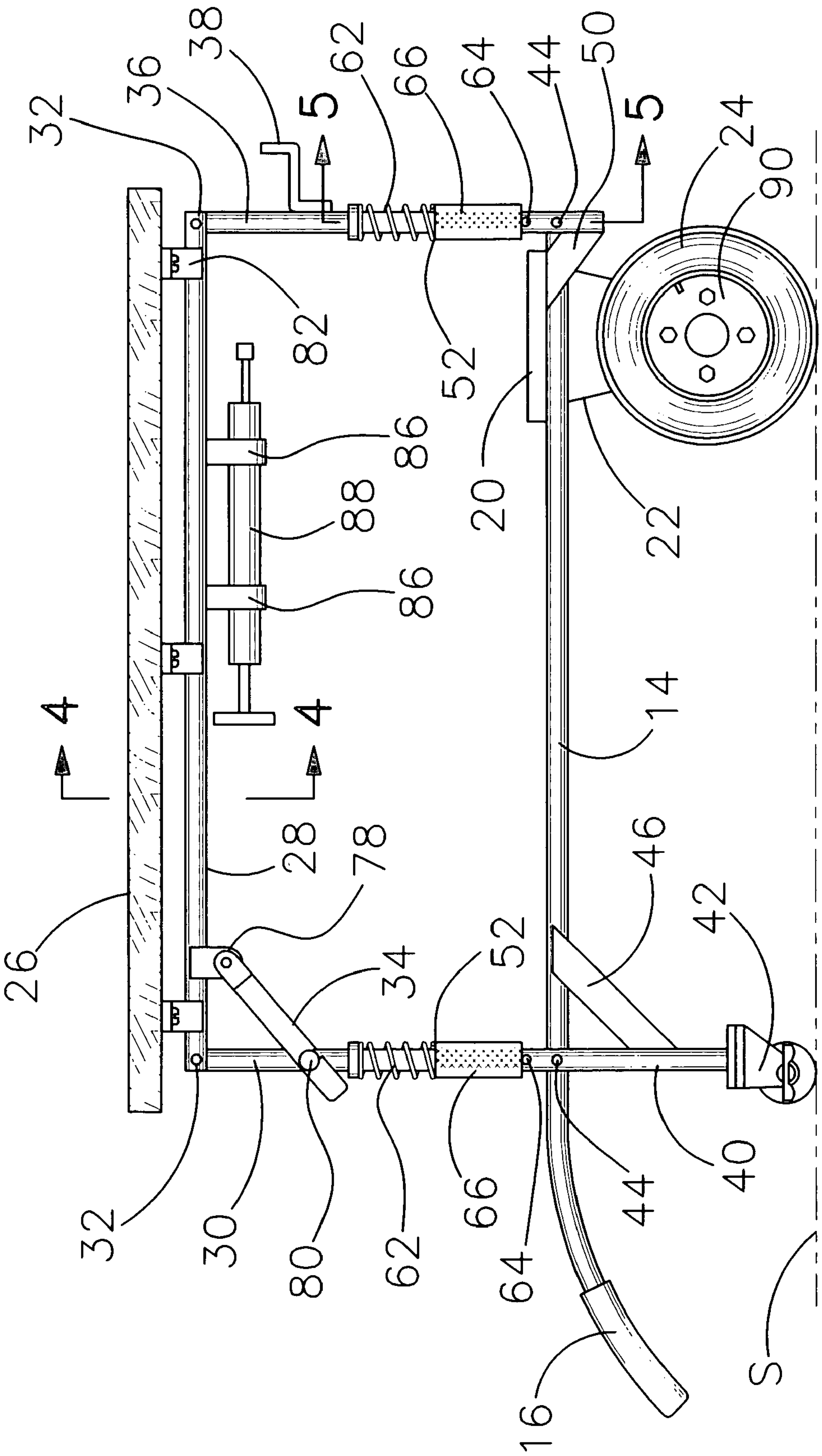
FIG. 2 is a side view of the portable worktable of the present invention in the raised position.
Figure 3:
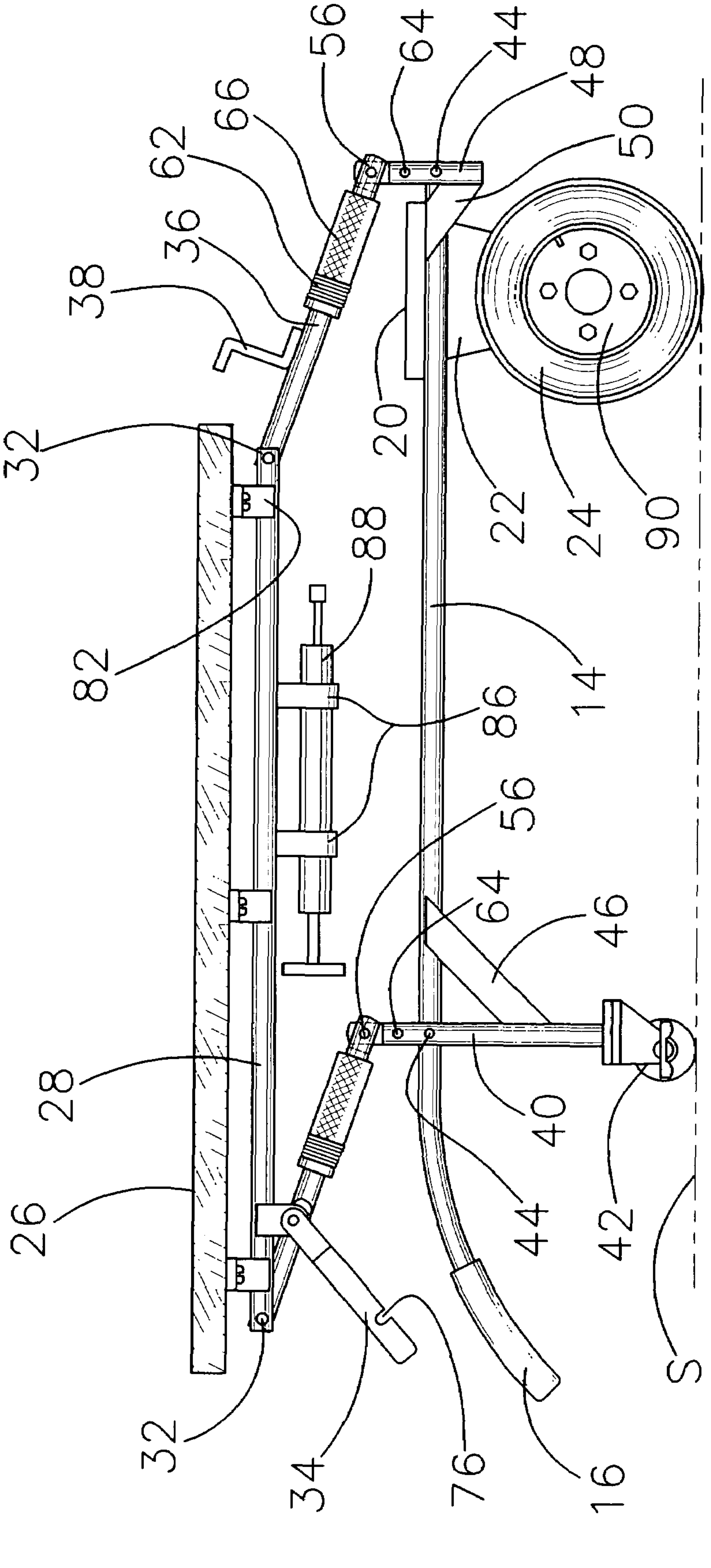
FIG. 3 is a side view of the portable worktable of the present invention in the lowered position.

Referring now to the drawings, and particularly to FIGS. 1–3, a preferred embodiment of the portable worktable of the present invention is shown and generally designated by the reference numeral 10.

In FIG. 1, a new and improved portable worktable 10 of the present invention for repairs inside finished building spaces and transport of cargo is illustrated and will be described. More particularly, the portable worktable 10 has a frame 12 of rectangular shape formed with steel tubular parts. Rails 14 form the sides of the frame 12. Spacers 18 hold the rails 14 apart and parallel, providing stiffness to the frame 12. Spacers 18 are welded to the rails 14. Each rail 14 has a grip 16 attached to an arcuate end of a rail 14 thus denoting the front of the present invention. Opposite the grips 16, a steel plate 20 extends perpendicular to the frame 12 and perpendicular to the longitudinal axis of each rail 14. The plate 20 attaches to each rail 14. Extending perpendicular downwards from the plate 20 on each side, parallel and inside the rails 14, steel supports 22 have a trapezoidal shape with the wide base at the rails 14. A wheel 24, parallel to the rails 14, rotates about its axis located near the bottom of each support 22.

Above the frame 12, the portable worktable 10 has a top 26 made of plywood and a rectangular shape similar to the shape of the frame 12. The top 26 attaches to a pair of runners 28 parallel to and above the rails 14. The top 26 has a means to secure cargo 30 upon the perimeter of the top 26 near the rear. At each corner of the present invention 10, a leg connects the runners 28 to the frame 12. A means to secure a leg 36 maintains the top 26 above the frame 12 with the leg perpendicular to the top 26 and lowers the top 26 to the frame 12 with the leg securing means 36 released. In the front corners, the front upper legs 32 of flat steel join the front end of the runners 28 at a pivot joint 34. The front upper legs 32 hang downwards from the top 26.

The front lower legs 40 of flat steel extend downwards on the outside of the rails 14 and join the rails 14 at a pivot joint 34. Beneath the rails 14, a pair of struts 42 extends beneath the front lower legs 40 as tubular steel and has at least one spacer 18 between them. The struts 42 terminate in casters 44. The struts 42 have a second connection to the frame 12 by a front fixed brace 46 of narrow flat steel that spans upward and rearward diagonally between a strut 42 and a rail 14.

Connecting the front upper leg 32 and the front lower leg 40, the hinge assembly 50 permits raising and lowering the top 26 relative to the frame 12. A hinge 52 joins the front upper leg 32 to the front lower leg 40 and permits the front upper leg 32 and the front lower leg 40 to rotate. The hinge assembly 50 operates so that the front upper leg 32 folds upon the front lower leg 40 with the hinge 52 located towards the center of a rail 14.

In the rear corners, the rear upper legs 38 of tubular steel join the rear end of the runners 28 at a pivot joint 34. The rear lower legs 48 of flat steel extend downwards on the outside of the rails 14 and join the rails 14 at a pivot joint 34. Beneath the rails 14, the supports 22 proceed down from the lower legs 48 and carry the wheels 24.

Turning to FIG. 2, this figure shows the portable worktable 10 in the raised position upon a surface S. The portable worktable 10 maintains a raised position through the hinge assembly 50 on the upper legs 32, 38 and lower legs 40, 48. The hinge assembly 50 begins with a hinge 52 joining the upper legs 32, 38 and the lower legs 40, 48. Away from the hinge 52, the lower legs 40, 48 continue away from the pivot joint 34 with a lip L and a pin P. The lip L extends perpendicular to the lower leg 40, 48 and on the side towards the center of a rail 14. The lip L engages the side of the upper leg 32, 38 to prevent rotation of the hinge 52 outward of the portable worktable 10. The pin P extends perpendicular to the lower leg 40, 48 and perpendicular to a rail 14. The pin P engages a notch in the side of the upper leg 32, 38 to prevent inadvertent rotation of the hinge 52 during use of the top 26 in the raised position.

The portable worktable 10 has a top 26 attached to a pair of runners 28. The runners 28 are parallel and above the rails 14. The top 26 fastens to and moves with the runners 28 and then the upper legs 32, 38 into the portable worktable's 10 raised and lowered positions. Beneath one runner 28, the portable worktable 10 provides an air pump 54 that rests in brackets 56 welded to the runner 28. The air pump 54 has a handle for manual power and a fitting for the valve V on the wheels 24 of the portable worktable 10.

As a convenience feature, the portable worktable 10 has hooks 58 on the perimeter of the top 26 near the rear of the invention 10. The hooks 58 serve as the means to secure cargo 30 upon the invention and extend rearward of the portable worktable 10. The hooks 38 of formed steel have a generally L-shape bolted to the top 26. A worker may place a ladder or cargo on the hooks 38 for movement with the portable worktable 10.

FIG. 3 reveals the portable worktable 10 in the lowered position. The portable worktable 10 attains this position upon releasing the hinge assemblies 50 and lowering the legs. Pushing the hinges 52 toward the center of the rails 14 releases the hinge assemblies 50. The pins P escape from the notches and the lips L direct rotation of the hinges 52 to fold the upper legs 32, 38 upon the lover legs 40, 48.

Figure 4:
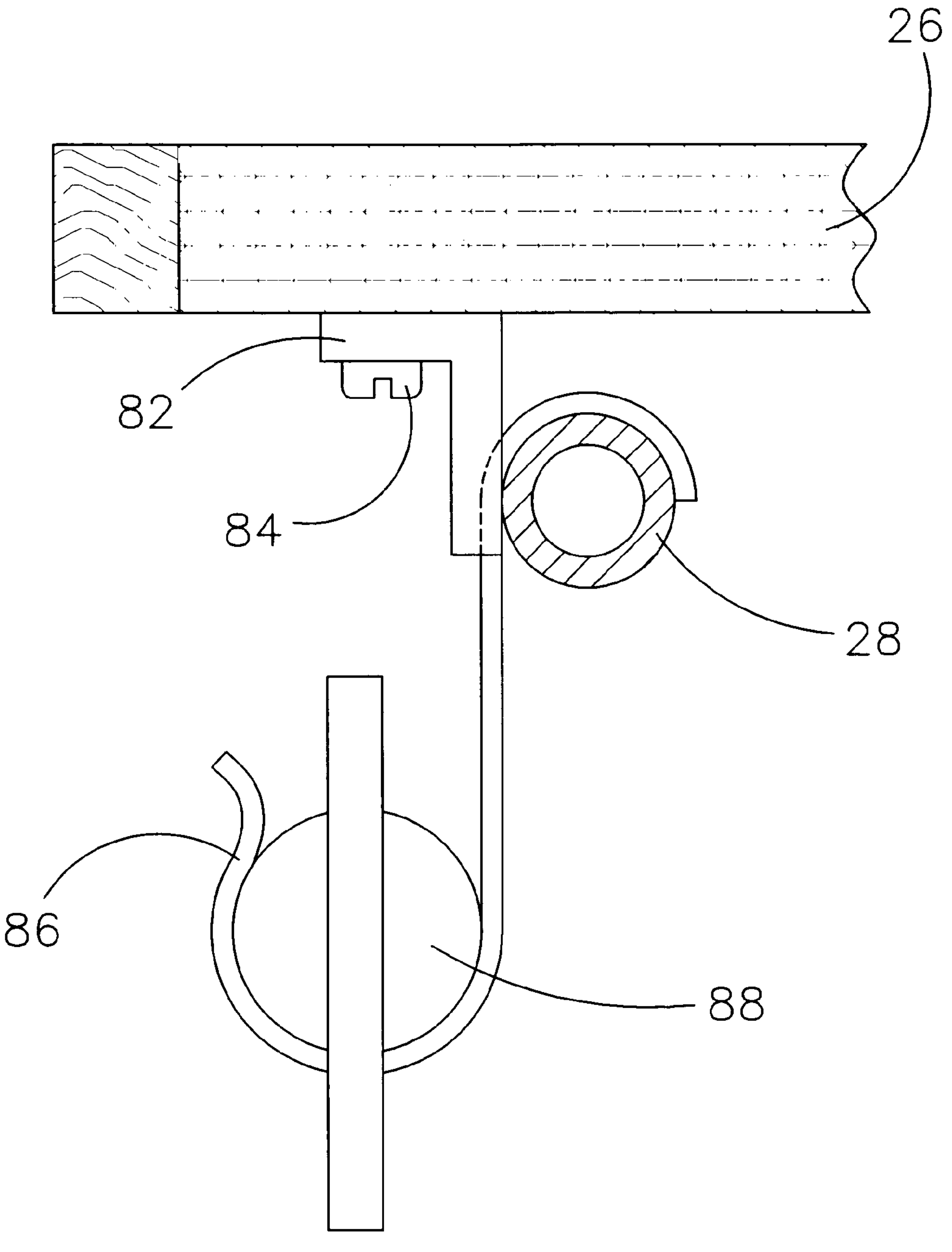
FIG. 4 is a sectional view of an air pump and its associated mount for the portable worktable of the present invention.

Turning to FIG. 4, this figure shows the handle and the air pump 88 beneath the top 26. The air pump 88 resets in a rounded end of a bracket 86 where the rounded end fits the shape of the air pump 88, typically a cylinder. From the air pump 88, the bracket 86 continues with a semi-circular overhang that resets stop the runner 28. The bracket's 86 overhang is welded to the runner 28. F*ig*. 4 then shows a typical connection of the top 26 to a runner 28. the connection has a tab 82 of angle steel with vertical and horizontal legs and a fastner. The vertical leg of the tab 82 is welded on the outside of the runner 28 and away from the center hole to accept a fastener 84. The fastener 84 is a screw that advances into and secures the top 26. With the top 26 secured to the tab 82 by the fastener 84, the top 26 moves with the runners 28.

Figure 5:
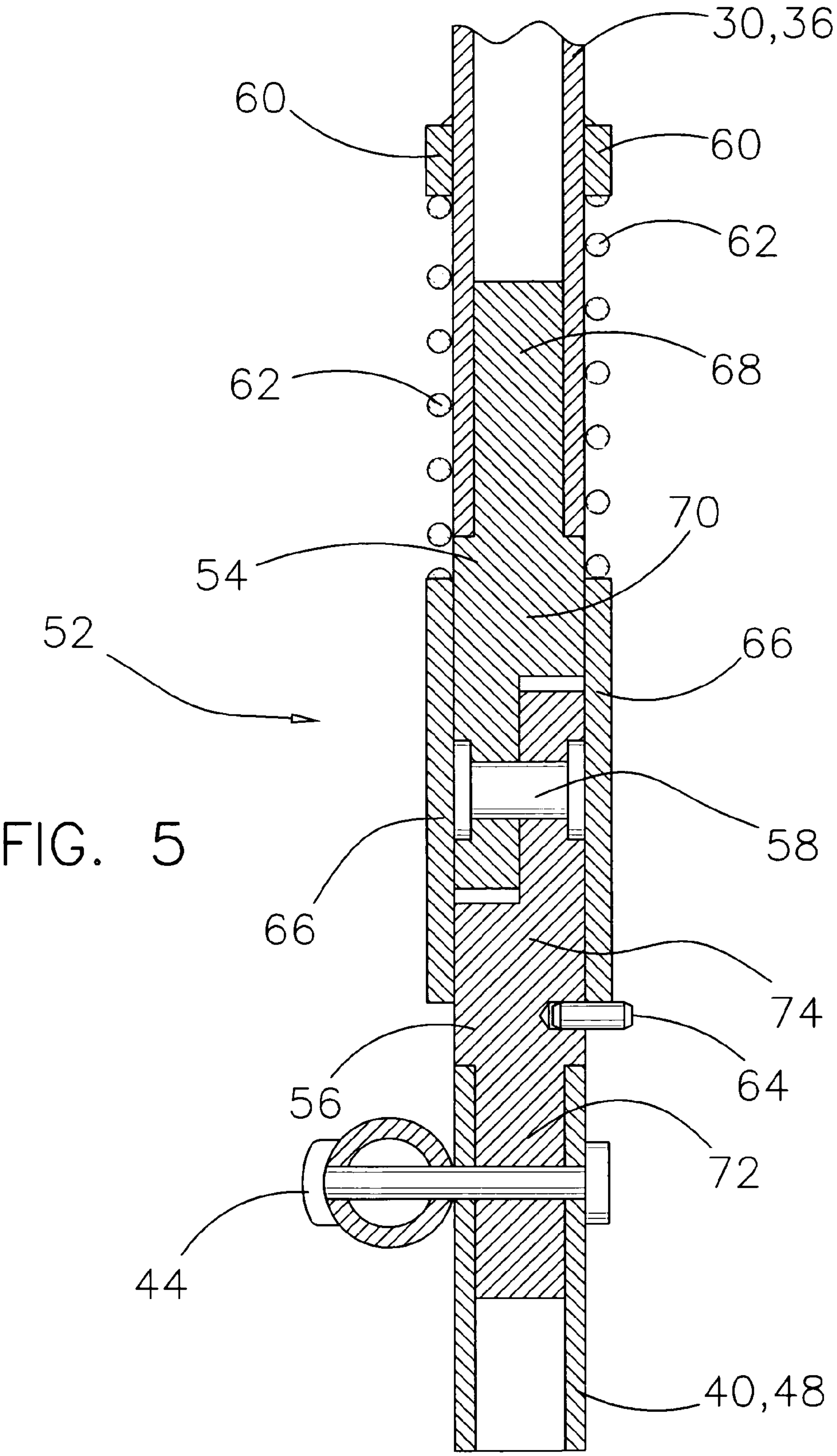
FIG. 5 is a sectional view of the spring catch and fixed joint for each leg of the portable worktable of the present invention.

In FIG. 5, a detailed view if an individual spring catch 52 shows the upper legs 30, 36, the lower legs 40, 48 and these components: a stop ring 60, a spring 62, an upper finger 54, a lower finger 56, a stop pin 64, a pivot 58, and a sleeve 66. A stop ring 60 of steel has a hollow cylindrical shape and an inner diameter that of the upper leg 30, 36. For assembly of the spring catch 52, the stop ring 60 is slipped over the upper leg 30, 36 and welded to the outside surface of the upper leg 30, 36 in the bottom half of the upper leg 30, 36. Next, a spring 62 of steel wire in a helical shape has an inner diameter that of the upper leg 30, 36. For assembly of the spring catch 52, the spring 62 is moved over the upper leg 36 and then it hangs beneath the stop ring 62 and above the sleeve 66.

In use, it can now be understood that hinge assemblies 50 secure the top 26 in a horizontal position and the upper legs 32, 38 and lower legs 40, 48 in an upright position. The hinge assemblies 50 on the four legs, with matching pins P and notches and lips L, cooperate to maintain the top 26 horizontal and the portable worktable 10 stable. A worker can perform tasks and use tools upon the top 26 in the raised position. In addition, the hinge assemblies 50 permit lowering the top 26. To store the portable worktable 10, a worker pushes the hinges 52 to release the upper legs 40, 48 and the lower legs 32, 38 for rotation. A worker would fold the upper legs 32, 38 inside of the lower legs 40, 48 towards the center of the invention 10 and bring the top 26 to the lowered position. In the lowered position, a worker can utilize the invention 10 similar to a hand truck 60 and move cargo. A hand truck 60 typically has a plate 20, frame 12, a pair of wheels 24 beneath the plate 20, and a pair of grips 16 upon the frame 12 and opposite the plate 20.

While a preferred embodiment of the portable worktable has been described in detail, it should be apparent that modifications and variations thereto are possible, all of which fall within the true spirit ard scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, or a composite may be used instead of the steel parts and wood top described. For an alternate embodiment, the present invention uses an existing hand truck in place of the frame, rails, spacers, plate, struts, casters, supports, and wheels in the preferred embodiment. In the alternate embodiment, the lower legs attach to the hand truck at pivot joints and the top raises and lowers as previously described. Depending on the material, connections by glue, mechanical means, or joinery may be used instead of the welds described and implied. And although repairs inside finished building spaces and transport of cargo have been described, it should be appreciated that the portable worktable herein described is also suitable for temporary use in homes and workshops.

Therefore, the foregoing is considered as illustrative only of the principles of the invention. Further, since numerous modifications and changes will readily occur to those skilled in the art, it is rot desired to limit the invention to the exact construction and operation shown and described, and accordingly, all suitable modifications and equivalents may be resorted to, falling within the scope of the invention.

I claim:

1. A portable worktable comprising:

a frame rectangular in shape, with two mutually parallel rails each having a grip, a plurality of spacers holding said rails laterally apart, each rail denotes a side of said portable worktable and said grips denote the front of said portable worktable; a plate of rectangular shape spanning between said rails at the rear of said frame; a pair of supports depending beneath said rails on the inside of said rails opposite said grips; and a pair of wheels parallel to and individually attached to said rails with the axis of said wheels near the bottom of said supports;

a planar top of rectangular shape mounted upon a pair of mutually parallel runners, with a means to secure cargo proximate to said top outwards of said portable worktable;

a pair of front upper legs, attaching near the front end of said runners with a pivot joint, depending from said top, and having a means to secure said front upper legs perpendicular to said top;

a pair of rear upper legs, attaching near the rear end of said runners with a pivot joint, depending from said top, and having a means to secure said rear upper legs perpendicular to said top;

a pair of front lower legs beneath said front upper legs that mate with said front upper legs individually, attaching near the front end of said rails at a pivot joint;

a pair of mutually parallel struts perpendicular to said rails, depending from said rails and terminating with casters, having a front fixed brace extending rearwards from said strut upwards to said rail;

and a pair of rear lower legs beneath said rear upper legs that mate with said rear upper legs individually, attaching near the rear end of said rails at a pivot joint proximate to said plate.

2. The portable worktable of claim 1 wherein the means to secure the top and the front upper legs and the top and the rear upper legs perpendicular to each other is a hinge assembly; said hinge assembly has a hinge joining said front upper legs and said front lower legs, and said rear upper legs and said rear lower legs whereby said hinge permits an upper leg to fold upon a lower leg and said hinge translates towards the center of said rail during folding.

3. The portable worktable of claim 2 wherein said rails, said spacers, said struts, and said runners, are tubular steel; said plate, said supports, said front fixed braces, aid front upper legs, said rear upper legs, said front lower legs, and said rear lower legs are flat steel.

4. The portable worktable of claim 1 wherein said planar top is made of plywood or steel and fastened to said runners.

5. The portable worktable of claim 1 further comprising a pair of wheels mutually parallel to said rails and said wheels attached to said supports.

6. The portable worktable of claim 5 wherein said wheels are hollow and inflatable.

7. The portable worktable of claim 5 wherein said wheels are solid.

8. The portable worktable of claim 6 further comprising:

said wheel having a valve for inflation;

an air pump for manual inflation of said wheel at said valve;

and a pair of brackets, spaced longitudinally along one runner to store said air pump.

9. The portable worktable of claim 1 wherein said casters swivel and lock.

10. The portable worktable of claim 1 wherein said means to secure cargo on said top is a pair of hooks, L-shaped attached to the perimeter of said top proximate to the rear of said worktable and oriented to secure cargo.

11. A method of assembling a portable worktable, said portable worktable being capable of movement from a lowered position in which it can be moved similar to a two wheeled hand truck to a raised position in which it can be locked in place similar to a four wheeled platform cart, said portable worktable including an elongated frame with laterally spaced, laterally connected, longitudinally extending rails, said frame having a front and an opposite rear, a plate mounted to said rear of said frame with depending supports for wheels, a top mounted upon runners, front and rear upper legs attached to each end of said runners with a hinge joint, front and rear lower legs attached to each upper leg with a hinge, said top maintained perpendicular to said upper legs via a hinge assembly, and said top has hooks to carry cargo, comprising the steps of:

a) placing said portable worktable with said wheels and casters on a surface;

b) lifting said top and said upper legs so that said upper legs align with said lower legs;

c) securing said hinge assemblies between said front upper legs and said front lower legs, and between said rear upper legs and said rear lower legs;

d) said portable worktable is lowered by performing the aforementioned steps in reverse thereby folding said hinge assemblies with the hinges towards the center of said portable worktable.

12. A portable worktable comprising:

a hand truck having a plate perpendicular to a frame and perpendicular to the longitudinal axis of said frame, a pair of wheels proximate to said plate, a pair of grips opposite said plate whereby said grips denote the front of said portable worktable and said plate denotes the rear of said portable worktable;

a planar top of rectangular shape mounted upon a pair of mutually parallel runners, with a means to secure cargo proximate to said top outwards of said portable worktable;

a pair of front upper legs at the front corners of said worktable, attaching near the front end of said runners with a pivot joint, having a means to secure said front upper legs perpendicular to said top and depending from said top;

a pair of rear upper legs at the rear corners of said worktable, attaching near the rear end of said runners with a pivot joint, having a means to secure said rear upper legs perpendicular to said top and depending from said top;

a pair of front lower legs beneath said front upper legs that mate with said front upper legs individually, attaching near the front end of said hand truck at a pivot joint;

and a pair of rear lower legs beneath said rear upper legs that mate with said rear upper legs individually, attaching near the rear end of said hand truck at a pivot joint.

13. The portable worktable of claim 12 wherein the means to secure said top and said front upper legs and said top and said rear upper legs perpendicular to each other is a hinge assembly; said hinge assembly has a hinge joining said front upper legs and said front lower legs, and said rear upper legs and said rear lower legs whereby said hinge permits an upper leg to fold upon a lower leg and said hinge translates towards the center of said frame during folding.

14. The portable worktable of claim 13 further comprising a planar top made of plywood or steel and fastened to said runners.

15. The portable worktable of claim 14 wherein said means to secure cargo on said top is a pair of hooks, L-shaped attached to the perimeter of said top proximate to the rear of said worktable and oriented to secure cargo.

* * * * *